United States Patent [19]

Ebenstein

[11] Patent Number: 5,481,483
[45] Date of Patent: Jan. 2, 1996

[54] NON-CONTACT METHOD OF OBTAINING DIMENSIONAL INFORMATION ABOUT AN OBJECT FOR COMPARING SIMILAR OBJECTS

[75] Inventor: Samuel E. Ebenstein, Southfield, Mich.

[73] Assignee: Ford Motor Company, Dearborn, Mich.

[21] Appl. No.: 374,351

[22] Filed: Jan. 18, 1995

Related U.S. Application Data

[62] Division of Ser. No. 980,419, Nov. 23, 1992, Pat. No. 5,384,717.

[51] Int. Cl.$^6$ .................................................. G06K 9/46
[52] U.S. Cl. ............... 364/561; 364/474.26; 364/474.34; 356/2; 356/3; 382/152; 382/154
[58] Field of Search ........................... 364/560–563, 364/525, 526, 474.24, 474.26, 474.34, 552; 382/8, 16, 17, 22, 141, 152, 154; 356/1–3

[56] References Cited

U.S. PATENT DOCUMENTS

| | | | |
|---|---|---|---|
| 4,864,227 | 9/1989 | Sato | 324/158 F |
| 4,878,169 | 10/1989 | Toner et al. | 364/413.19 |
| 4,972,311 | 11/1990 | Holdgrafer et al. | 364/167.01 |

*Primary Examiner*—Emanuel T. Voeltz
*Assistant Examiner*—Craig Steven Miller
*Attorney, Agent, or Firm*—Richard D. Dixon; Roger L. May

[57] ABSTRACT

Circular reference features such as drilled holes are located in an area of a part such as a cylinder head, the surface of which is laser scanned to obtain scan data. The scan data provides height values of the part. Differences in height values are used to determine the points on scan lines which are boundary points of the circular holes. A first algorithm is used to estimate the contour and radius of each hole. A second algorithm provides a correction factor for the radius of each hole. The circular reference features are used for registering the part relative to a reference datum. Methods are provided that allow the accurate determination of the location of such reference features to within 0.01 mm. (0.0004 in.) from the scan data. The method may be utilized to create modified scan data to machine the part. The method may be utilized iteratively from different views of the part to obtain data which represents the part. Also, the method may be utilized iteratively on similar parts to detect minor differences between the parts.

2 Claims, 10 Drawing Sheets

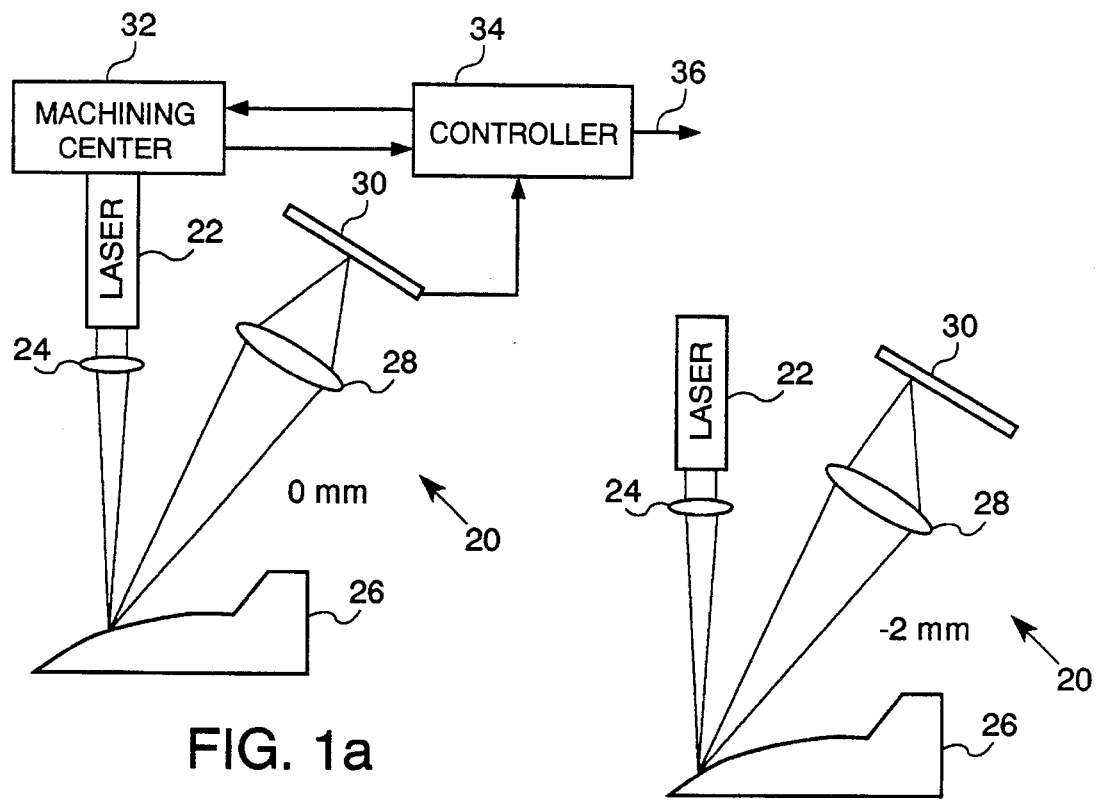
FIG. 1a
FIG. 1b
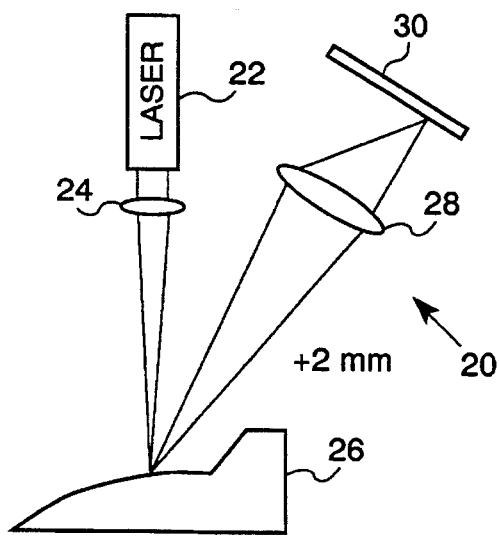
FIG. 1c
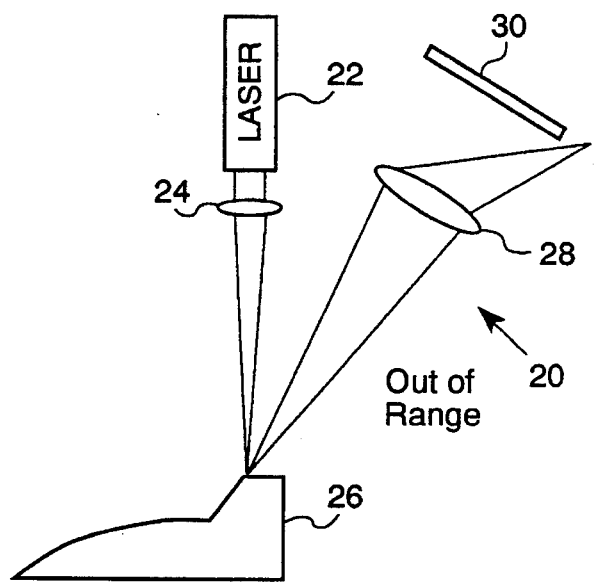
FIG. 1d

NON-CONTACT METHOD OF OBTAINING DIMENSIONAL INFORMATION ABOUT AN OBJECT FOR COMPARING SIMILAR OBJECTS

This is a divisional of application Ser. No. 07/980,419, filed on Nov. 23, 1992, now U.S. Pat. No. 5,384,717.

TECHNICAL FIELD

This invention relates to non-contact methods for obtaining dimensional information about an object and, in particular, to laser scan methods for obtaining dimensional information about an object.

BACKGROUND ART

Circular features are often used as locating datums in manufacturing. Such features can be accurately produced with relative ease, and can be used to determine the position and orientation of parts. Part location is critical during machining since often a part must be removed from a machine and repositioned on the machine for subsequent machining operations. If part orientation is not precisely known, it is very difficult to accurately mate and assemble parts.

Laser scanning is a technique which is being used for capturing the geometry of engine parts such as combustion chambers, intake and exhaust ports. These features are complex free-form shapes and require many measurements to accurately describe them. Determining the true position of these free form surfaces in the overall cylinder head can be quite difficult.

A coordinate measuring machine (CMM) is used to measure apart, and reference features are measured to establish the coordinate system for measuring other features of interest. However, CMM is mainly used for inspection of known parts and not for capture of free form geometry. CMM machines typically have algorithms to find features such as holes or edges from user supplied nominal locations. The process, however, is slow, interactive and operator intensive. In comparison, laser scanning is not highly interactive but it requires feature determination off-line through statistical processing.

SUMMARY OF THE INVENTION

It is an object of the present invention to provide a non-contact method which precisely determines the dimensions of at least one reference feature of an object.

Another object of the present invention is to provide a laser scan method which precisely determines the dimensions of at least one reference feature of an object such as the location and radius of a curved reference feature.

In carrying out the above objects and other objects of the present invention, a method is provided for obtaining dimensional information about an object at a vision station. The method includes the step of generating reference data relating to a surface of the object to be scanned. The surface includes at least one reference feature of the object. The at least one reference feature has a boundary. The method also includes the steps of scanning a beam of controlled light at the surface of the object located at the vision station based on the reference data to generate reflected light signals and imaging the reflected light signals to a measuring area of a photodetector means to produce corresponding electrical signals proportional to the measurements. The method includes the steps of computing scan data based on the electrical signals, determining at least a portion of the boundary of the at least one reference feature based on the scan data to obtain boundary data, and computing dimensional information associated with the at least one reference feature of the object based on the boundary data.

The above method steps may be repeatedly performed to generate multiple sets of scan data from different views of an object. The sets of scan data are then merged to obtain data which represents the object.

The above method steps may also be repeatedly performed with respect to similar objects in order to compare the objects.

The above method steps may further be performed together with the steps of modifying the scan data and generating a toolpath data from the modified data in order to machine the object.

The design of engine intake ports and combustion chambers is an iterative process which requires the production of several prototypes which differ based on flow testing and dynamometer testing. Comparison of these prototypes requires accurate scan registration so that parts which are only slightly different can be adequately compared. It is also possible to transfer the scan data to an engineering work station where it can be viewed, and modified if desired. This modified data can be transferred back to the machining center where the part was scanned. This machining center contains software to construct and execute NC toolpaths from scan data. This process allows incorporation of design modifications performed on scan data to be used in the production of a physical part.

Accurate part registration is critical so that the finished part will mate properly with the rest of the engine. For example, one may wish to build a flow box to test a cylinder head design. The necessary data for constructing the flow box may be obtained by separate scans of the intake and exhaust ports and the combustion chamber. However, without accurate part registration, it is difficult if not impossible to integrate the scans to build a functional flow box.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIGS. 1A–1D is a schematic view of a laser scanner operation in accordance with the present invention;

BEST MODE FOR CARRYING OUT THE INVENTION

Figure 2:
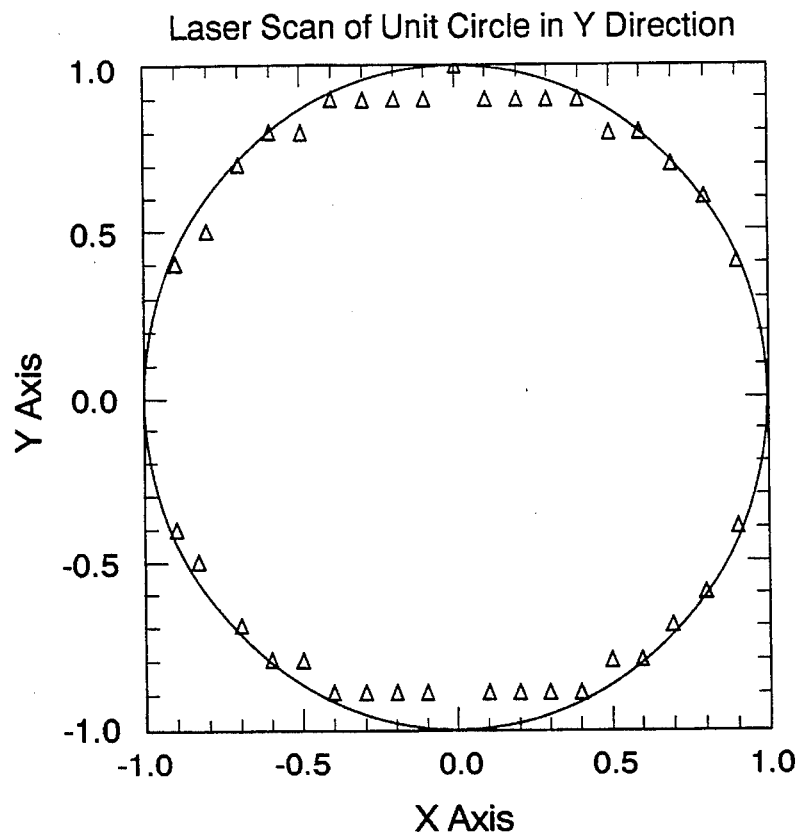
FIG. 2 is a graph illustrating the interior boundary points resulting from a laser scan of unit circle in the Y direction.

Referring now to the drawing figures, there is illustrated the method and system of the present invention. In FIGS. 1A through 1D, a laser scanner, generally indicated at 20, operates on the triangulation principle. A beam of laser light is generated by a laser 22 and is focused by a lens 24 on a part 26 being scanned to produce an illuminated spot of approximately 0.2 mm in diameter. An image of this spot is viewed by an "eye" or lens 28 that focuses the spot image on a sensor 30 mounted at an angle to the axis of the laser beam. The sensor 30 contains a linear array of 1024 photodetectors or photodiodes. The position at which the image of the spot falls on the array is a function of the distance of the point being scanned to the scanner 20. The number of photodetectors illuminated will vary as the angle of the surface of the part 26 varies. In general several photodetectors will be illuminated. The light intensity for each photodetector illuminated is used to compute the centroid of the spot image and thus achieve an accurate measurement independent of the surface angle. Since the size of the sensor 30 is limited, there is a limited range in which the scanner 20 can operate and maintain the spot image on the sensor 30. This determines the depth of field for the scanner 20. A typical depth of field is 6 mm.

In operation, the laser scanner 20 is mounted in the spindle of a vertical machining center 32 and is moved over the surface of the part 26 being scanned by the center's X and Y axes in a series of linear scans.

The laser scanner 20 communicates with a controller 34 of the machining center 32 and adjusts the Z axis to maintain the scanner 20 within a 6 mm depth of field. The Z dimension returned along a line 36 from the scanning system is then the algebraic sum of the Z axis servo move and the position given by the laser scanner 20.

A prediction algorithm may be employed to move the scanner 20 up or down based on the last series of points scanned. This system works effectively for smoothly varying contours of parts and allows up to 70 points a second to be scanned. However, when a discontinuity in the surface of a part is encountered, like the vertical wall of a hole, the system must search up and down until the spot falls on the sensor. This searching is the most time consuming part of the scanning operation since it may take several seconds for the system to search out the new depth if the change is large.

When scanning a part, a user first defines the polygonal boundary of the area of the part 26 to be scanned (preferably up to 100 points). This boundary may be defined by inputting X,Y coordinates or by moving the laser probe to the points in a "teach" mode. This distance between points along a scan and the distance between scan lines is also user selectable down to 0.02 min. Rectangular grids are usually specified but are not required.

DETERMINATION OF THE HOLD RADIUS

Without loss of generality, it is assumed that a hole of interest in a part has its center at the origin (0.0,0.0) in the cartesian coordinate system. One wishes to find the best estimate for the radius of the hole given scan data as input. The data is given by $x_1, x_2, \ldots, x_n$ and $y_1, y_2, \ldots, y_n$, where $x_i$ and $y_i$ are the x and y coordinates of points on the circular boundary of the hole. By using the least squares approach, a value of r that minimizes the following error sum is sought:

$$\Sigma^n_{i=1}(x_i^2+y_i^2-r^2)^2 \qquad (1)$$

The value of r which minimizes the error as given in Equation (1) is:

$$r = \sqrt{\frac{\Sigma^n_{i=1}(x_i^2+y_i^2)}{n}} \qquad (2)$$

The real world problem is slightly different however since it is very difficult to determine which points lie exactly on the boundary of the hole. (For sake of simplification, one may assume that the circle is the boundary of a hole which has been drilled into a flat block.) In general, it is difficult to find the boundary of the hole without human intervention. By using laser scanning techniques, one can determine whether a point is outside the hole or inside the hole based on its z coordinate, since the points inside the hole have a lower z coordinate than those outside.

Referring now to FIG. 2, there is illustrated a graph of interior boundary points of a circle with scanning done in the Y direction. The radius of the circle is found by basing an estimate on points in the interior of the circle, but the same techniques can be applied to the exterior points.

By using the laser scanner 20, one can determine those points inside the circle which are closest to the boundary, i.e. a point is "near" the boundary of the circle if either the previous or next point is outside the circle. These points are the first point and last point inside the circle for a given scan line. The scan data consists of z coordinates of a rectangular grid in x,y, and the increments in the x and y directions are given by $\Delta x$ and $\Delta y$.

For example, one can consider the first quadrant of the circle (i.e. the region where x and y are non-negative) and compare the observed value for the radius, $r_{observed}$, with the actual value, $r_{actual}$. If one considers scan lines with x fixed and y varying, the theoretical estimate is given by Equation (1) for $x_i$, $y_i$ where x and y are the coordinates of the intersection of the scan lines with the circle in the first quadrant. The experimental estimate, however, is given by:

$$r_{observed} = \sqrt{\frac{\Sigma^n_{i=1}(x^2_{observed}(i)+y^2_{observed}(i))}{n}} \qquad (3)$$

Clearly $$r_{observed} < r \quad (4)$$

However, one wishes to calculate an estimate for r which is better than $r_{observed}$. For sake of simplicity, $r^2$ and $r_{observed}$ are utilized as follows:

$$r^2_{observed} = \frac{\Sigma^n_{i=1}(x^2_{observed}(i) + y^2_{observed}(i))}{n} \quad (5)$$

Since x is fixed along each scan line, $$x_{observed}(i) = x_{actual}(i); \quad (6)$$

$$y_{observed}(i) = y_{actual}(i) - error_i * \Delta y; \quad (7)$$

and $$0 <= error_i < 1 \text{ for } 1 <= i <= n \quad (8)$$

If Equation (7) is squared, one obtains:

$$y^2_{observed}(i) = y^1_{actual}(i) - 2*error_i*y_{actual}(i)*\Delta y + \Delta y^2 \quad (9)$$

Since $\Delta y$ is assumed to be small, one has:

$$\Delta y^2 << \Delta y \quad (10)$$

and $$y^2_{observed}(i) = y^2_{actual}(i) < 2*error_i*y_{actual}(i)*\Delta y \quad (11)$$

By comparing the Equations (5) and (11) one obtains:

$$r^2_{observed} \approx \frac{\Sigma^n_{i=1}(x_i^2 + y_i^2)}{n} - 2*\Delta y * \frac{\Sigma^n_{i=1} error_i * y_i}{n} \quad (12)$$

$$\approx r^2_{actual} - 2*\Delta y * \frac{\Sigma^n_{i=1} error_i * y_i}{n} \quad (13)$$

If one assumes that error and y are roughly statistically independent, and that the function error is approximately uniformly distributed, then one can replace error in the summation by its average value ½. One obtains:

$$r^2_{observed} \approx r^2_{actual} - \Delta y * \frac{\Sigma^n_{i=1} y_i}{n} \quad (14)$$

and $$\frac{\Sigma^n_{i=1} y_i}{n} \approx \int_o^r y\,dx = \int_o^r \sqrt{r^2 - x^2}\,dx \quad (15)$$

where r is the actual radius of the circle and for the first quadrant $$y = \sqrt{r^2 - x^2} \quad (16)$$

The value of the integral is $r * \pi/4$, which gives:

$$r^2_{observed} \approx r^2_{actual} - \frac{r_{actual} * \pi \Delta y}{4} \quad (17)$$

The following expression for the actual radius in terms of the observed radius is obtained:

$$r_{actual} = \frac{b + \sqrt{b^2 + 4r^2_{observed}}}{2} \quad (18)$$

where $$b = \frac{\pi \Delta y}{4} \quad (19)$$

Without loss of generality, Equation (17) can be used with x,y data taken from the entire circle, and not restricted to the first quadrant. If one assumes that $r_{observed}$ is very close to $r_{actual}$, then the following relationship from Equation (17) is obtained:

$$r_{actual} = \sqrt{r^2_{observed} + r_{observed}\frac{\pi \Delta y}{4}} \quad (20)$$

This equation is easier to use and gives almost the same results as Equation (17) as long as $r_{observed}$ is relatively close to $r_{actual}$ (i.e. within 1%). If boundary points on the outside of the circle instead of the inside the circle are used, a similar relationship between $r_{actual}$ and $r_{observed}$ is obtained, except that the correction factor $$r_{observed}\frac{\pi \Delta y}{4} \quad (21)$$

must be subtracted instead of added. This yields:

$$r_{actual} = \sqrt{r^2_{observed} - r_{observed}\frac{\pi \Delta y}{4}} \quad (22)$$

Determining $r_{observed}$

The initial assumption was that the center of the hole is at the origin. This was used to calculate $r_{observed}$. If this is not true, $r_{observed}$ and the center of the hole $x_o,y_o$ must be calculated by other methods. In this case, a modification of the Levenberg-Marquardt algorithm which eliminates the need for explicit derivates can be used to recursively determine the center and radius of the hole from the boundary points.

The Levenberg-Marquardt algorithm solves non-linear least squares problems by starting with an initial estimate $X^o$ for the minimum point. A sequence of approximations to the minimum X is generated by the following:

$$X^{n+1} = X^n - [\alpha_n D_n + J^T_N J_n]^{-1} J^T_n f(X^n) \quad (23)$$

where:

$J^n$ is the numerical Jacobian matrix evaluated at $X_n$;

$D_n$ is a diagonal matrix equal to the diagonal of $J^T_n H_n$;

$\alpha_n$ is a positive scaling constant; and f is a vector function to be minimized.

This method is used to determine the parameters $x_o, y_o$ and $r_{observed}$ which minimize the following sum:

$$\Sigma^n_{i=a}[(x_i-x_o)^2 + (y_i-y_o)^2 - r^2_{observed}]^2 \quad (24)$$

Boundary points P are eliminated where $|dist(P,X) - R| > 2.4*\sigma$, where X represents the center of the hole, R the radius, and $\sigma$ is the standard deviation of $dist(P,X) - R$, and 2.4 is a number from the normal distribution which corresponds to a 98% confidence interval.

The correction factor is applied to obtain a better estimate for the radius which takes into account that the "boundary points" are not really in the boundary of the circular feature.

MATHEMATICAL SIMULATION OF THE METHOD

Mathematical simulations were used to test both the validity and accuracy of the method. Simulations were done for both coarse (1 and 0.5 mm) scans and fine scans (0.05 and 0.025 mm). FIGS. 4 through 7 show the results of both types of scans in determining the coordinates $x_o, y_o$ of the center and the radius of the hole. As can be readily seen from the FIGS. 4 and 5, the main factor which determines the accuracy in finding the center of the hole is the number of data points (i.e. boundary points).

Figure 6:
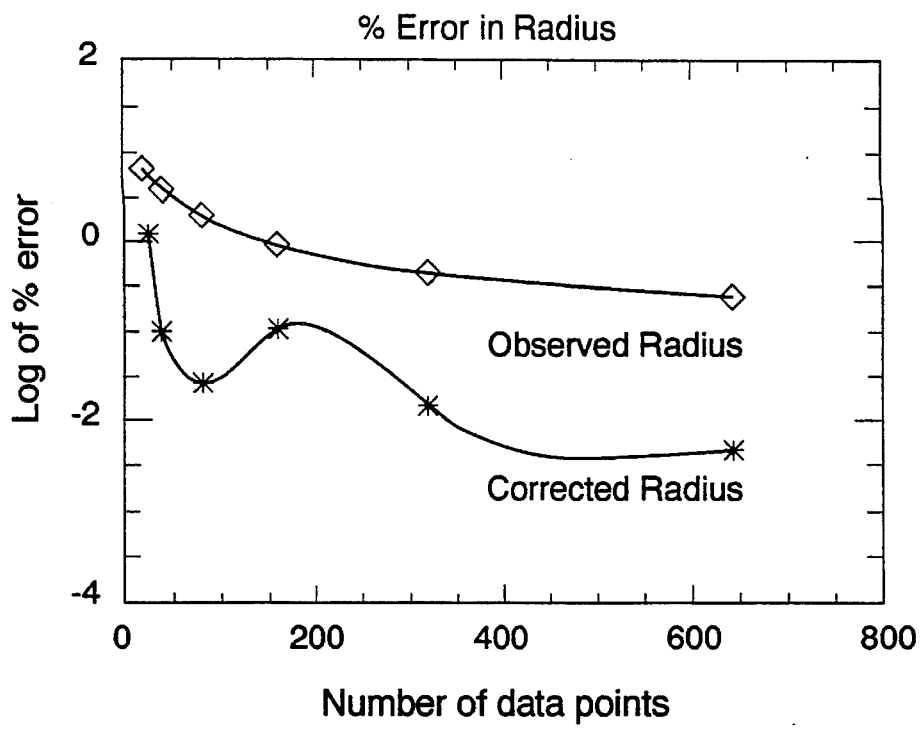
FIG. 6 is a graph of log of % error vs. number of data points for course scans to determine hole radius.
Figure 7:
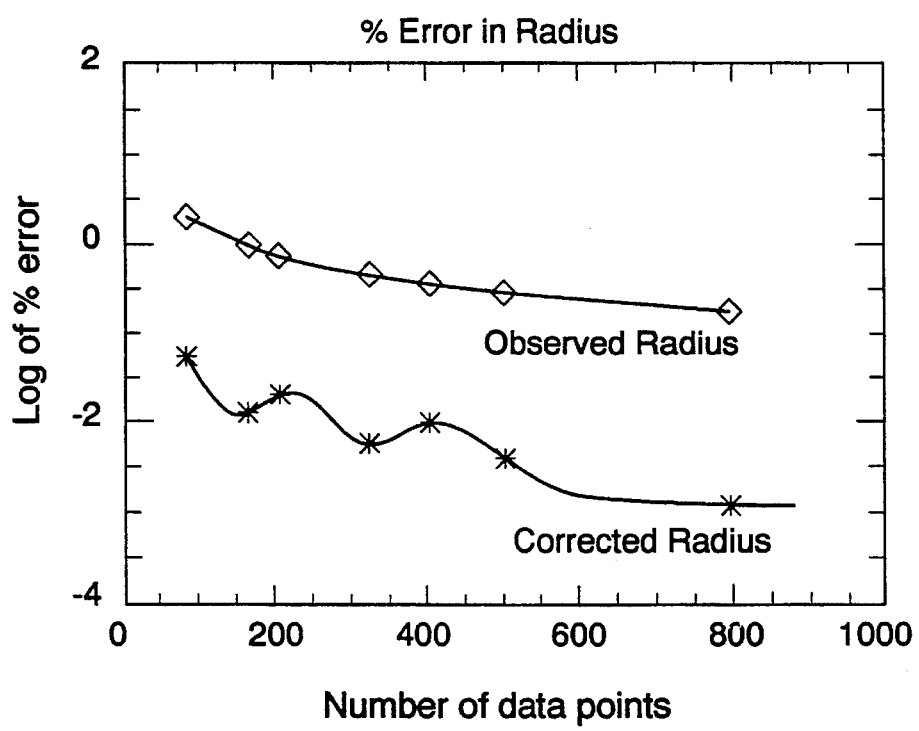
FIG. 7 is a graph of log of % error vs. number of data points for fine scans to determine hole radius.

FIGS. 6 and 7 show that as the number of data points increases, the error in the observed radius gradually decreases. The curve which describes the error in the corrected radius is not monotonic because the accuracy in the observed radius may vary, and sometimes Equation (13) approximates Equation (12) more precisely. However, in general, the log of the error in the corrected radius is 2 less than the log of the error in observed radius, which gives the following relationship:

$$\text{error}_{corrected} \approx 0.01 * \text{error}_{observed} \quad (25)$$

i.e., the corrected radius is 100 times as accurate as the observed radius.

In one simulation of a fine scan with 800 points, the corrected error was 0 (to six significant digits) and a nominal value of $10^{-03}$ was used to avoid a singularity with the log function.

Figure 8:
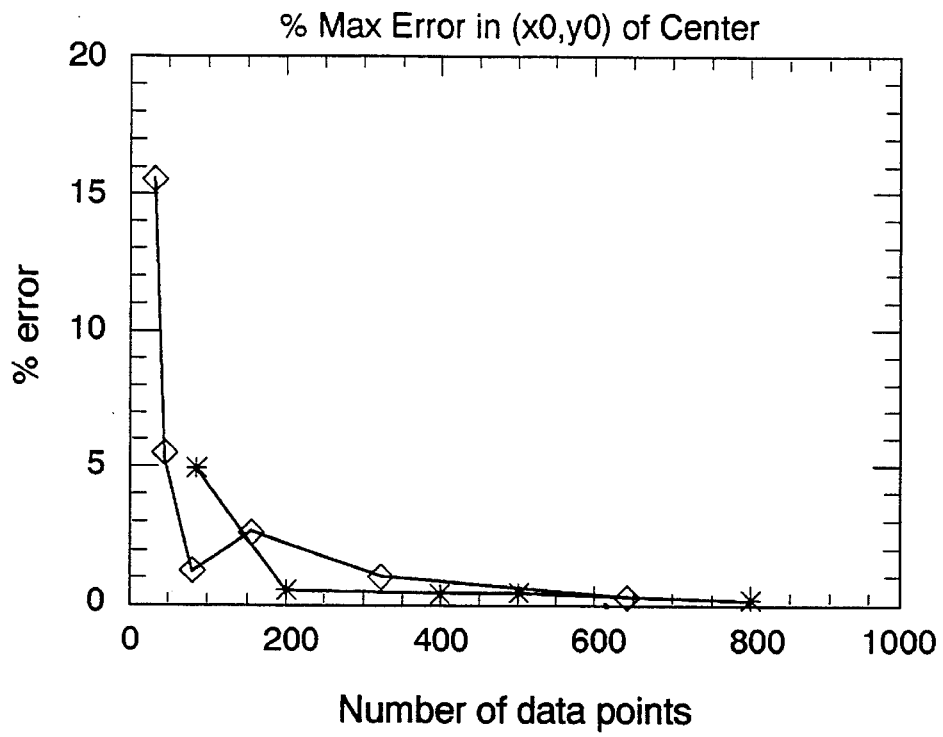
FIG. 8 is a graph of % error vs. number of data points for coarse and fine scans to determine hole radius.
Figure 9:
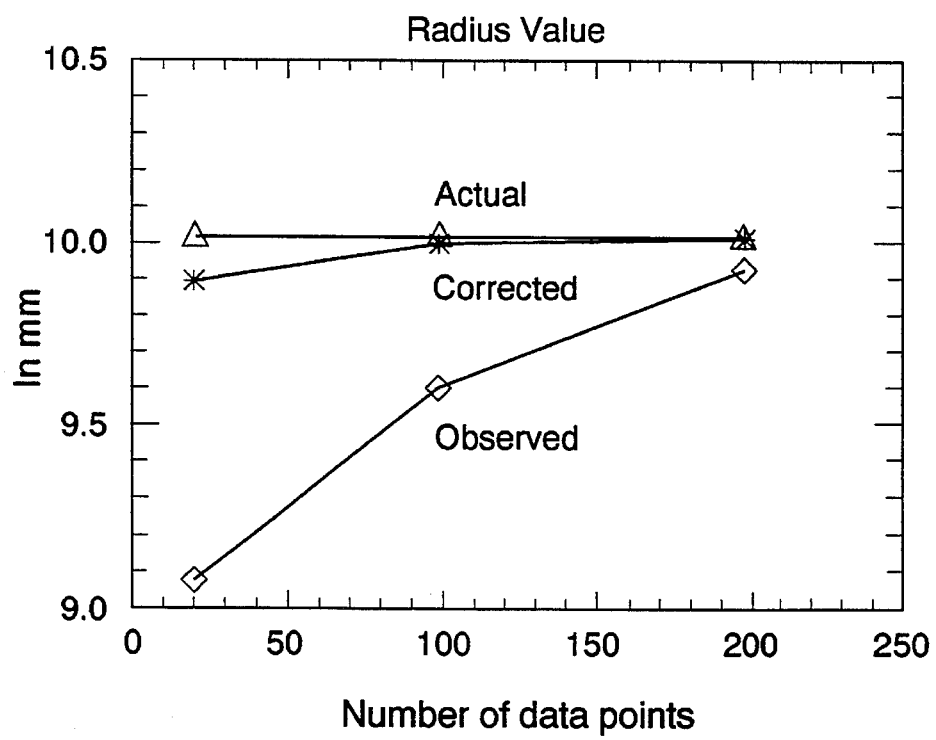
FIG. 9 is a graph of radius value in mm vs. number of data points for a first hole in FIG. 3.
Figure 10:
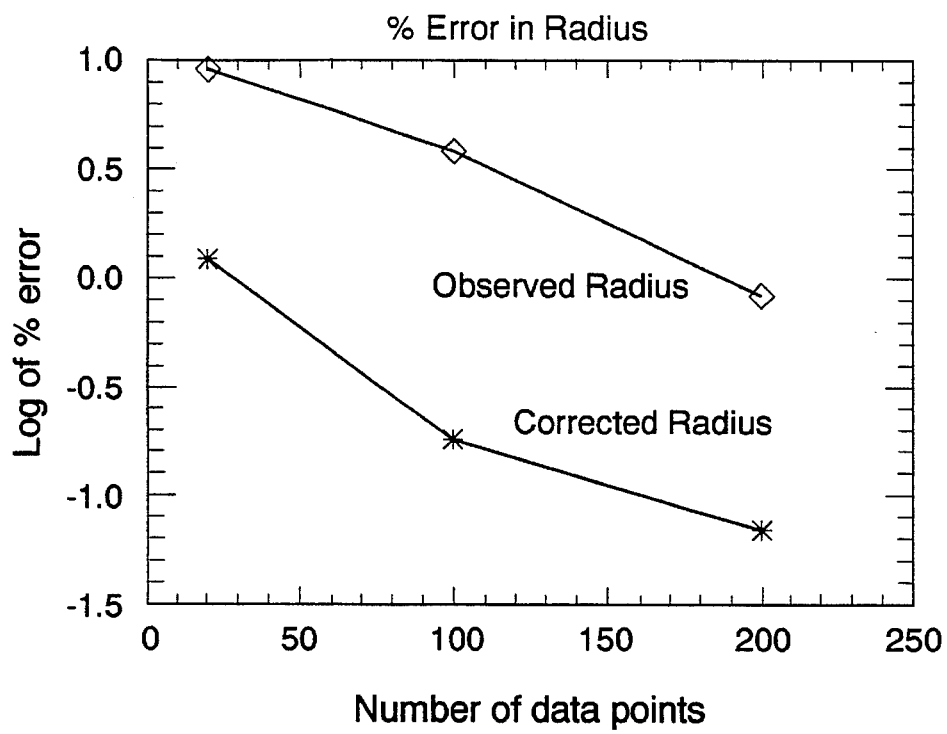
FIG. 10 is a graph of log of % error vs. number of data points for the first hole in FIG. 3.
Figure 11:
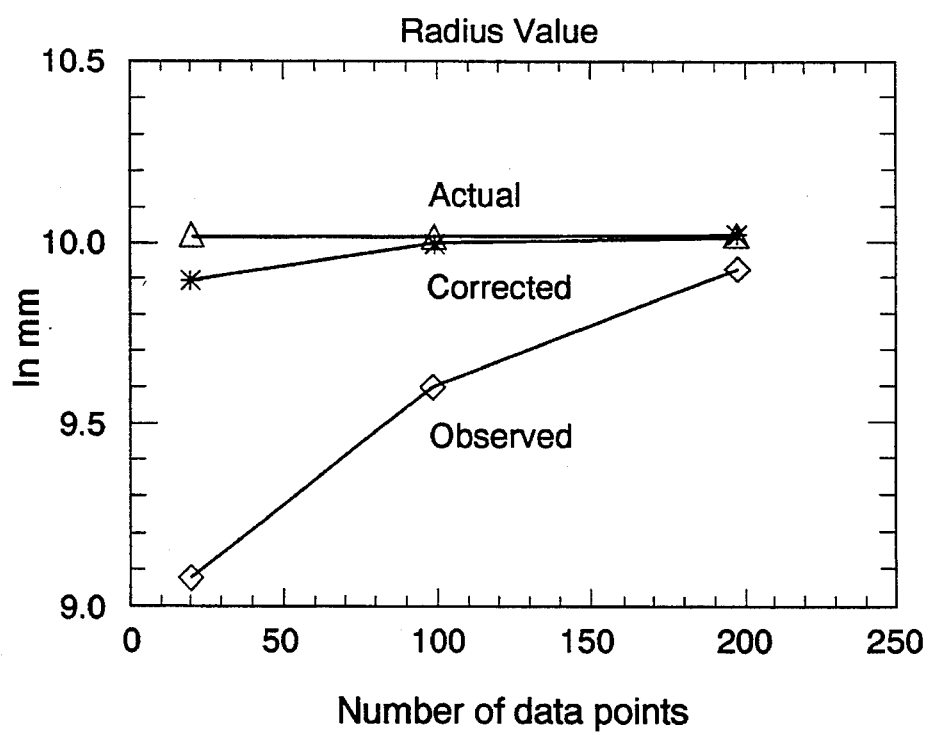
FIG. 11 is a graph of radius value in mm vs. number of data points for a second hole in FIG. 3.
Figure 12:
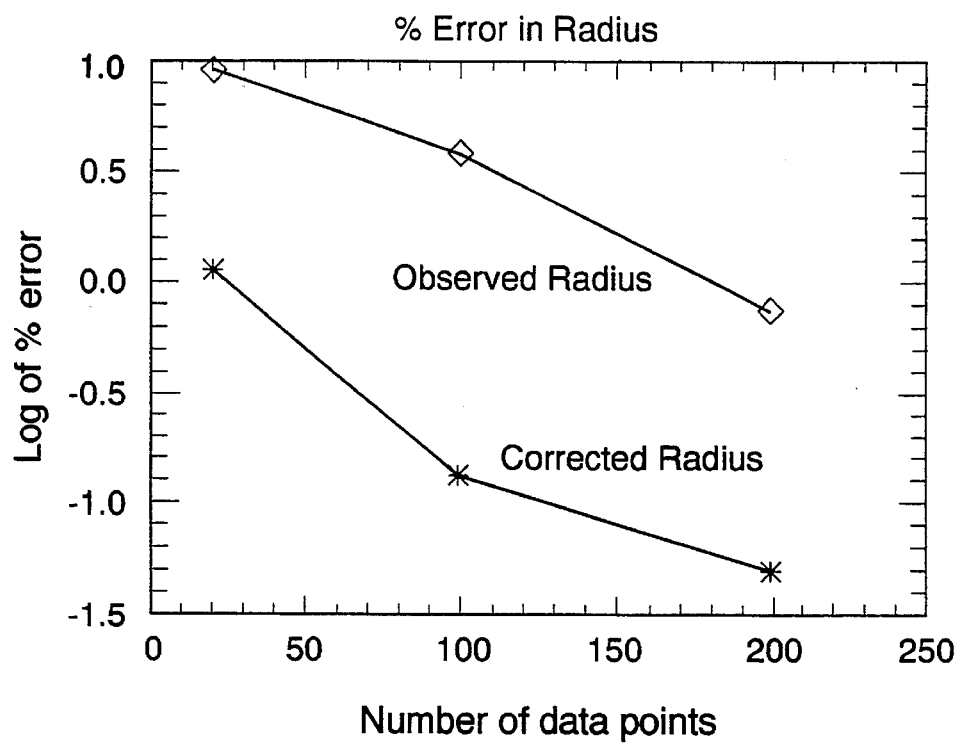
FIG. 12 is a graph of log of % error vs. number of data points for the second hole in FIG. 3.
Figure 13:
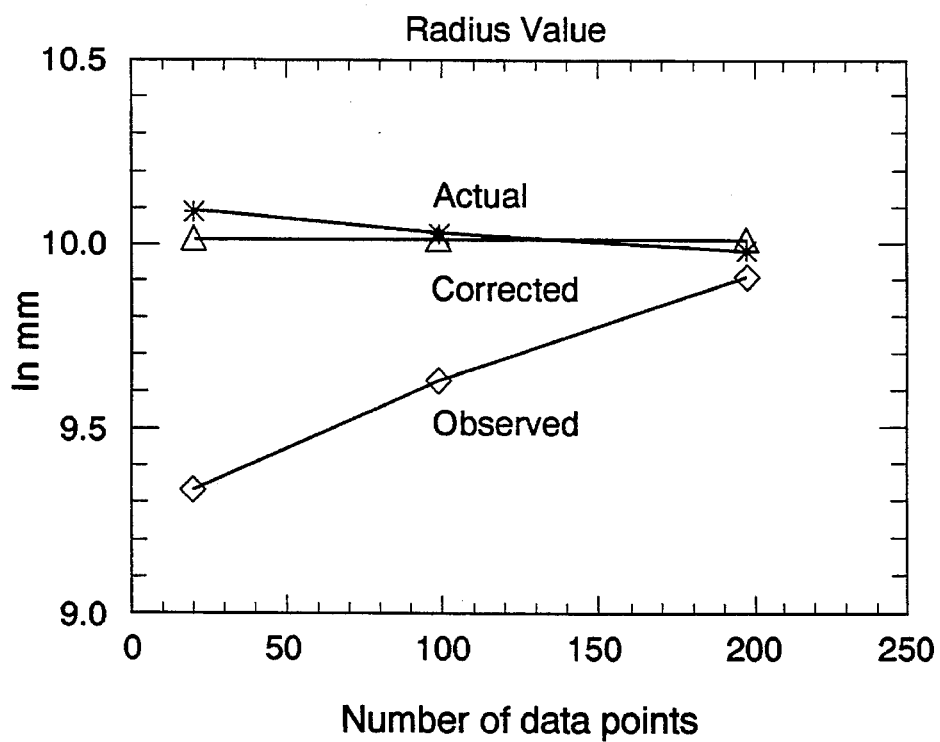
FIG. 13 is a graph of radius value in mm vs. number of data points for a third hole in FIG. 3.
Figure 14:
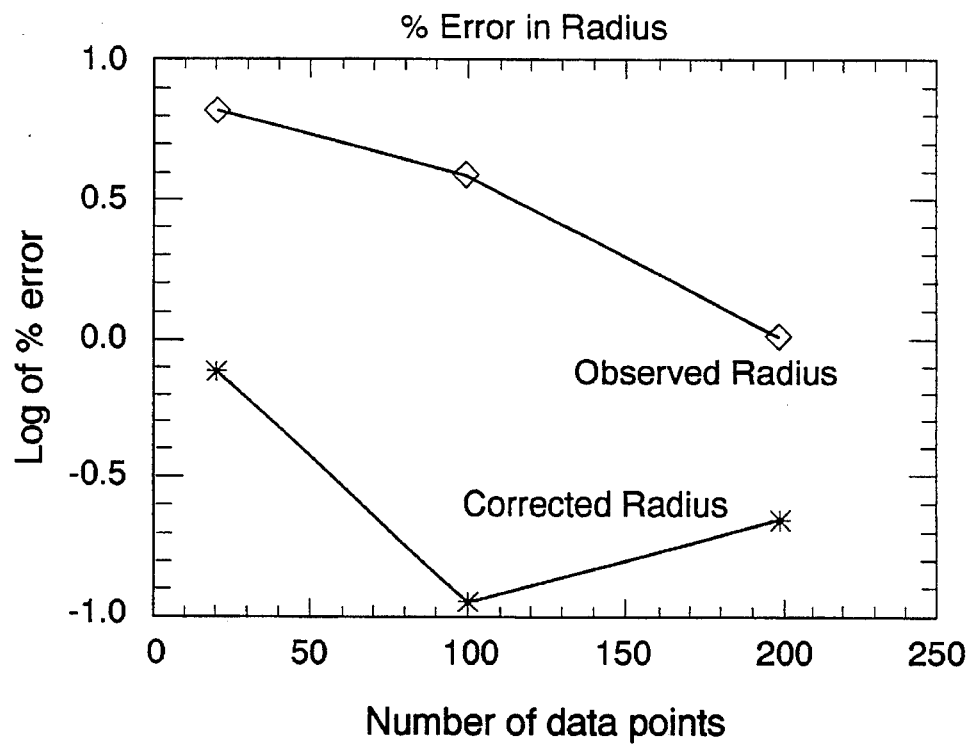
FIG. 14 is a graph of log of % error vs. number of data points for the third hole in FIG. 3.

FIG. 8 is a graph of % error versus number of data points for coarse and fine scans to determine hole radius.

DEMONSTRATION OF THE METHOD

Figure 3:
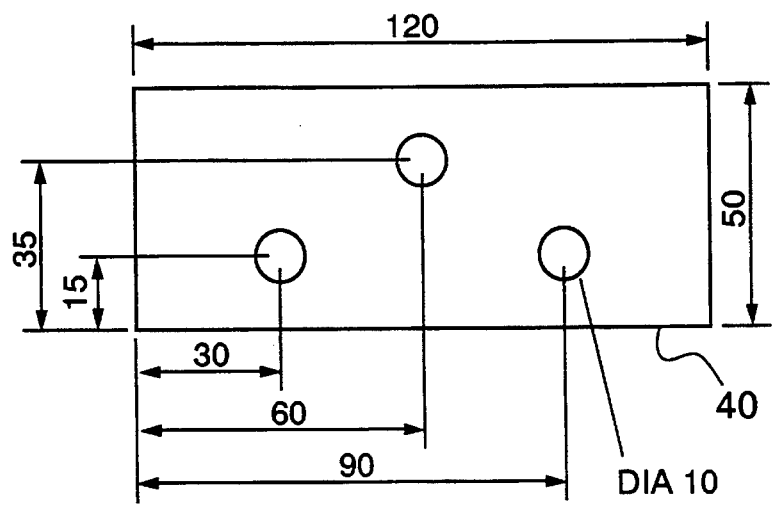
FIG. 3 is a dimensional drawing of a scan test block.
Figure 4:
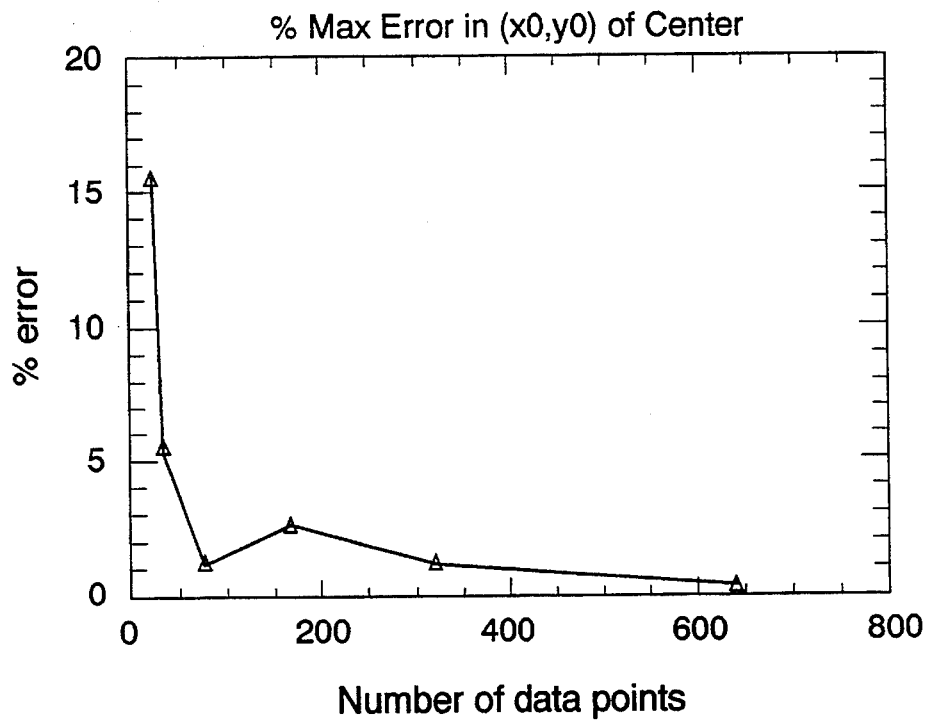
FIG. 4 is a graph of % error vs. number of data points for course scans to determine hole center.
Figure 5:
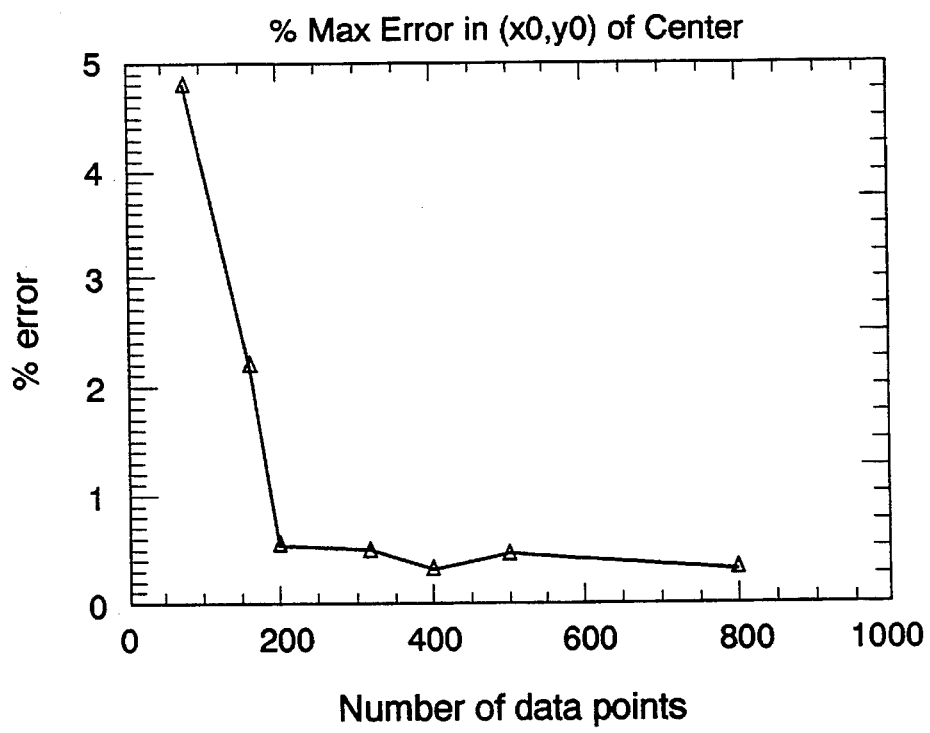
FIG. 5 is a graph of % error vs. number of data points for fine scans to determine hole center.

Referring now to FIG. 3, to validate the methodology, a metal block 40 of size 50 by 120 mm. with three drilled holes was scanned at scanning densities of 1.0, 0.5 and 0.1 mm in each of two orientations. (The laser scanner 20 is capable of scanning in the yz direction, or the xz direction.) The results for the xz scan are presented in the graphs of FIGS. 9 through 14. The results for the yz scan are similar. The values obtained from the laser scanning techniques were compared with those obtained from using a coordinate measuring machine (CMM) which is accurate to 0.001 mm. In the graphs, the coordinate measuring values are referred to as the "actual" values.

The results for hole 1 and hole 2 are almost identical since the centers of the two holes differ in position by almost exactly 30 mm. so the interior points for hole 2 are practically translates of those for hole 1. For the actual test, the log of the error in the corrected radius is approximately 1.3 less than that of the observed radius which yields:

$$\text{error}_{corrected} \approx 0.05 * \text{error}_{observed} \quad (26)$$

i.e., the corrected radius is 20 times as accurate as the uncorrected radius.

Measuring the accuracy of the determination of the center of the holes, requires the existence of a reference datum. Hole 1 was chosen as a reference datum, and the distances from its center to holes 2 and 3 were determined.

Figure 15:
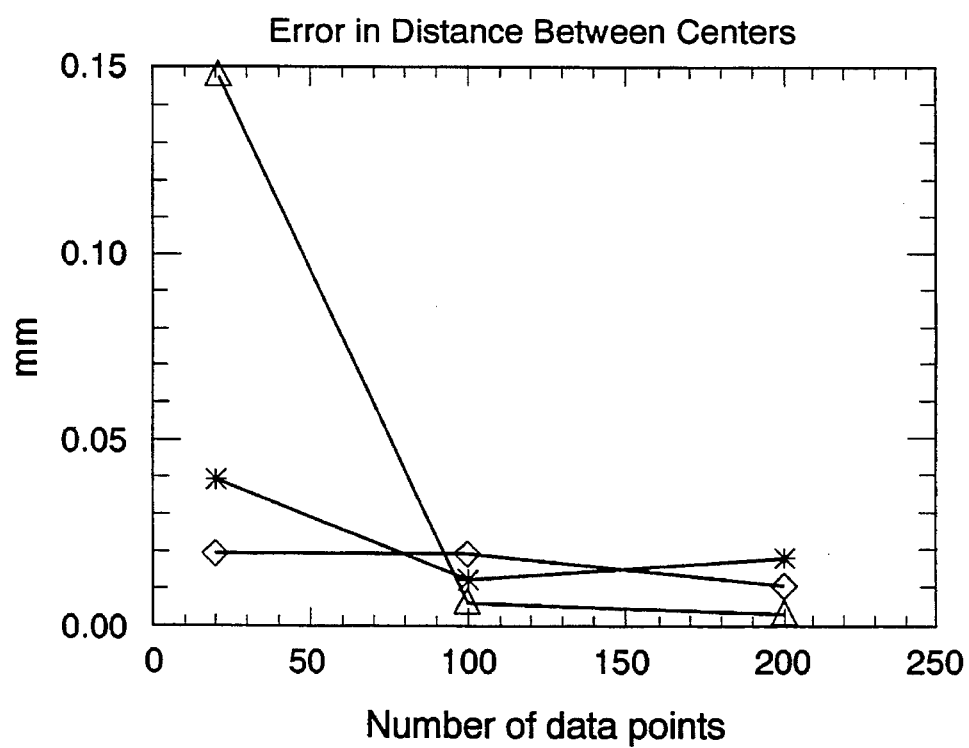
FIG. 15 is a graph of error in mm between centers vs. number of data points for the holes in FIG. 3.
Figure 16:
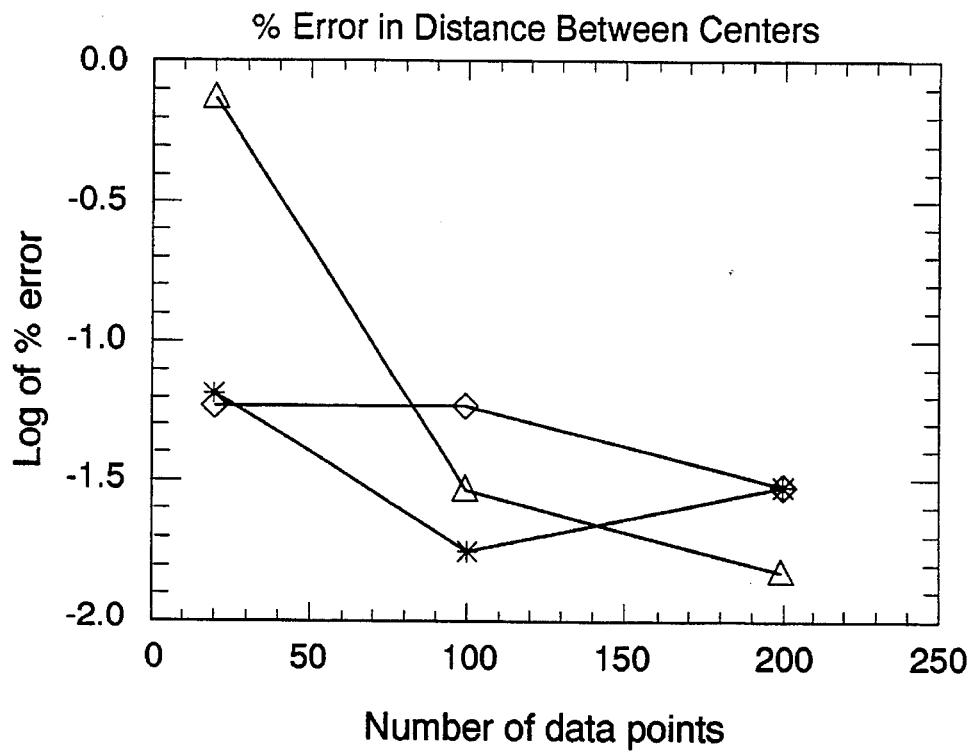
FIG. 16 is a graph of log of % error in distance between centers vs. number of data points for the holes of FIG. 3.

FIGS. 15 and 16 show the absolute and percentage error in these measurements. The nominal distance between holes 1 and 3 is 60 mm. in the x direction while hole 2 is 20 mm. above holes 1 and 3. The part was measured on a LK coordinate measuring machine to obtained the precise locations of the holes relative to hole 1.

APPLICATIONS

Figure 17:
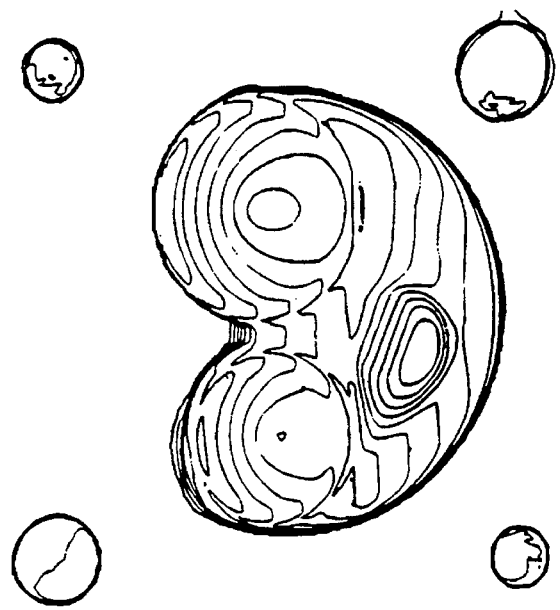
FIG. 17 is a contour plot of a flow box.
Figure 18:
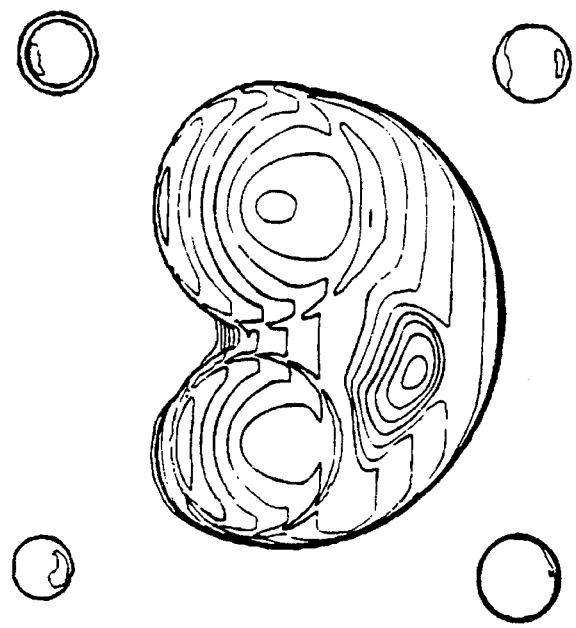
FIG. 18 is a contour plot of a metal head.
Figure 19:
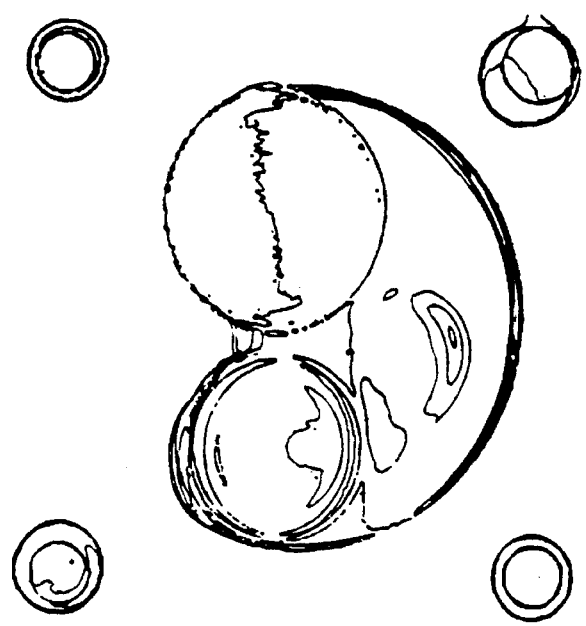
FIG. 19 is a contour plot illustrating the difference between the flow box and the metal head.

Using circular features as reference datums has many applications in laser scanning. Circular holes are commonly found in many parts, and holes can be easily drilled when necessary. The quick and accurate determination of the location of reference features such as circular holes facilitates the use of laser scans for part comparison. Often, a part may be scanned, modified and then rescanned. Alternatively, two very similar parts may be scanned. The circular features serve as reference datums and facilitate the comparison of different laser scans. If the reference features are properly aligned, the scans can be used to detect very subtle differences between parts, Scans of a flow box and a metal cylinder head may be aligned using circular holes as reference features to facilitate comparison of the scans. FIGS. 17 and 18 are contour plots of a flow box and a metal cylinder head, respectively. FIG. 19 is a contour plot of the difference between the flow box and metal head. FIG. 19 shows that the main differences between the two parts occur at the back wall of the chamber and in the location and depth of the reference holes.

Laser scanning is a useful tool for capturing and evaluating geometry of engine parts. It is also very useful for comparison of similar parts. It is necessary for the part to contain some standard reference feature to provide a reference datum so that different scans can be compared. Circular holes provide such a reference feature, and their location and diameter can be determined by the methods described above.

The methods used for finding circular holes can be extended to other geometric shapes such as ellipses. Other extensions include arbitrary feature boundaries such as the combustion chamber, valve seat and intake or exhaust port openings. Location and identification of such feature boundaries enable one to merge multiple scans of an entire complex object taken from different views. This provides a complete description of such an object which can then be exported to a CAD system.

While the best mode for carrying out the invention has been described in detail, those familiar with the art to which this invention relates will recognize various alternative designs and embodiments for practicing the invention as defined by the following claims.

I claim:

1. A method for comparing similar objects located at a vision station, the method comprising the steps of:

(a) generating reference data relating to a surface of an object to be scanned, the surface including at least one reference feature of the object, the at least one reference feature having a boundary;

(b) scanning a beam of controlled light at the surface of the object located at the vision station based on the reference data to generate reflected light signals;

(c) imaging the reflected light signals to a measuring area of a photodetector means to produce corresponding electrical signals;

(d) computing scan data based on the electrical signals, the scan data providing height values of the surface of the object;

(e) determining at least a portion of the boundary of the at least one reference feature based on the height values of the scan data to obtain boundary data;

(f) computing dimensional information associated with the at least one reference feature of the object based on the boundary data, wherein the at least one reference feature has a curved area defined by a radius and a center and wherein the dimensional information includes a value for the radius and coordinants of the center and wherein the step of computing the dimensional information includes the steps of estimating the coordinates of the center and the radius from the boundary data and correcting the estimated radius to obtain the value of the radius;

(g) repeating steps (a) through (f) for each other object at the vision station to determine the dimensional information for each other object; and (h) utilizing the dimensional information for each of the objects to compare the scan data for each of the objects to detect differences between the objects.

2. A method for comparing similar objects located at a vision station, the method comprising the steps of:

(a) scanning a surface of an object to generate reflected signals;

(b) converting the reflected signals to corresponding electrical signals;

(c) generating data which provides height values of a surface of the object based on the electrical signals, the surface including at least one reference feature of the object, the at least one reference feature having a boundary;

(d) determining at least a portion of the boundary of the at least one reference feature based on the height values of the data to obtain boundary data;

(e) computing dimensional information associated with the at least one reference feature of the object based on the boundary data wherein the at least one reference feature has a curved area defined by a radius and a center and wherein the dimensional information includes a value for the radius and coordinants of the center and wherein the step of computing the dimensional information includes the steps of estimating the coordinates of the center and the radius from the boundary data and correcting the estimated radius to obtain the value of the radius;

(f) repeating steps (a) through (e) for each other object at the vision station to determine the dimensional information for each other object; and (g) utilizing the dimensional information for each of the objects to compare the data for each of the objects to detect differences between the objects.

* * * * *